US011169980B1

(12) United States Patent
Revach et al.

(10) Patent No.: US 11,169,980 B1
(45) Date of Patent: Nov. 9, 2021

(54) ADAPTIVE DATABASE COMPACTION

(71) Applicant: Microsoft Technology Licensing, LLC, Redmond, WA (US)

(72) Inventors: Eliyhhu Revach, Rehovot (IL); Jony Vesterman Cohen, Rishon LeZion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/878,656

(22) Filed: May 20, 2020

(51) Int. Cl.
*G06F 16/22* (2019.01)
*G06F 16/21* (2019.01)
(52) U.S. Cl.
CPC ........ *G06F 16/2282* (2019.01); *G06F 16/217* (2019.01); *G06F 16/219* (2019.01)
(58) Field of Classification Search
CPC .. G06F 16/1744; G06F 16/219; G06F 16/217; G06F 16/2282; G06F 16/27; G06F 3/0608; G06F 3/065; H04L 67/1002
See application file for complete search history.

(56) References Cited

U.S. PATENT DOCUMENTS

| | | | |
|---|---|---|---|
| 9,396,202 B1 | 7/2016 | Kesselman et al. | |
| 9,747,322 B2 | 8/2017 | Drobychev et al. | |
| 10,346,431 B1* | 7/2019 | Broda | G06F 16/182 |
| 2005/0005200 A1* | 1/2005 | Matena | G06F 9/5072 |
| | | | 714/38.13 |
| 2016/0306810 A1* | 10/2016 | Ni | G06F 16/122 |
| 2017/0031910 A1 | 2/2017 | Atedgi et al. | |
| 2017/0242916 A1 | 8/2017 | Revach et al. | |
| 2017/0249057 A1 | 8/2017 | Aaron et al. | |
| 2017/0316003 A1 | 11/2017 | Mor et al. | |
| 2017/0317950 A1 | 11/2017 | Revach et al. | |
| 2017/0357710 A1 | 12/2017 | Shtossel et al. | |
| 2018/0004358 A1 | 1/2018 | Revach et al. | |
| 2018/0004745 A1* | 1/2018 | Finkelstein | G06F 16/2379 |

(Continued)

OTHER PUBLICATIONS

"Upload large amounts of random data in parallel to Azure storage", retrieved from <<https://docs.microsoft.com/en-us/azure/storage/blobs/storage-blob-scalable-app-upload-files>>, Oct. 8, 2019, 7 pages.

(Continued)

*Primary Examiner* — Merilyn P Nguyen
(74) *Attorney, Agent, or Firm* — Ogilvie Law Firm

(57) ABSTRACT

Adaptive database compaction technology automatically identifies cost-effective opportunities for database compaction. The adaptive compaction technology may maintain a baseline sleeve representing a performance indicator's normal range, track the current performance indicator values, and initiate compaction of a database when a compaction trigger based on at least the performance indicator occurs. The performance indicator may be a ratio of logical size to physical size, and may be based on samples from a proper subset of the database. Kernel overhead may be recognized. A low-fragmentation secondary replica may be selected, compacted, and promoted to replace the prior primary replica. Secure cloud blob storage may be used. A compaction decision may allow, delay, or even prevent compaction after the trigger is met. An automatic balance between computational costs of compaction and costs of continued database use without compaction is kept, and may be tunable by an administrator.

20 Claims, 4 Drawing Sheets

EXAMPLE ADAPTIVE DATABASE COMPACTION METHOD 800

(56) References Cited

U.S. PATENT DOCUMENTS

| | | | |
|---|---|---|---|
| 2018/0089239 | A1 | 3/2018 | Gattegno et al. |
| 2018/0157560 | A1* | 6/2018 | Gochkov ............ G06F 11/2048 |
| 2018/0181680 | A1 | 6/2018 | Revach et al. |
| 2018/0196637 | A1 | 7/2018 | Dayan et al. |
| 2019/0114082 | A1* | 4/2019 | Pan ........................ G06F 3/065 |
| 2019/0266140 | A1 | 8/2019 | Revach et al. |

OTHER PUBLICATIONS

"Using Baselines", retrieved from <<https://softwaresupport.softwaregrp.com/doc/KM00209009?fileName=hp_man_NNM_iSPI_Metrics9.10_UsingBaseline_wp_pdf.pdf>>, 2009-2012, 16 pages.

"LPARS Revisited", retrieved from <<http://www.gsebelux.com/sites/default/files/091118%20-%20GSE%20LPARs%20revisited.pdf>>, 2009, 81 pages.

"ObjectRocket to Demonstrate New Features at MongoDB World", retrieved from <<https://www.rackspace.com/newsroom/objectrocket-to-demonstrate-new-features-at-mongodb-world>>, Jun. 25, 2014, 5 pages.

"Managing Apache Hive", retrieved from <<https://docs.cloudera.com/HDPDocuments/HDP3/HDP-3.1.5/managing-hive/content/hive_hive_data_compaction.html>>, 2012-2019, 2 pages.

Jitendra Bafna, "HBase Compaction and Data Locality With Hadoop", retrieved from <<https://dzone.com/articles/hbase-compaction-and-data-locality-with-hadoop>>, Mar. 2, 2017, 3 pages.

"Overview of Cloud Bigtable", retrieved from <<https://cloud.google.com/bigtable/docs/overview>>, Apr. 20, 2020, 10 pages.

"How much data storage capacity will be lost converting from FAT32 to NTFS?", retrieved from <<https://superuser.com/questions/621008/how-much-data-storage-capacity-will-be-lost-converting-from-fat32-to-ntfs>>, 2013, 3 pages.

"Database", retrieved from <<https://en.wikipedia.org/wiki/Database>>, Apr. 26, 2020, 22 pages.

Martin Horan, "Why Use SSH-Key Authentication for SFTP Instead of Password Authentication?", retrieved from <<https://www.ftptoday.com/blog/why-use-ssh-key-authentication-for-sftp-instead-of-password-authentication>>, Jan. 8, 2020, 5 pages.

Dias, et al., "NoSQL Database Performance Tuning for IoT Data—Cassandra Case Study", In Proceedings of the 3rd International Conference on Internet of Things, Big Data and Security, Mar. 19, 2018, pp. 277-284.

"International Search Report and Written Opinion Issued in PCT Application No. PCT/US2021/028527", dated Aug. 2, 2021, 12 Pages.

* cited by examiner

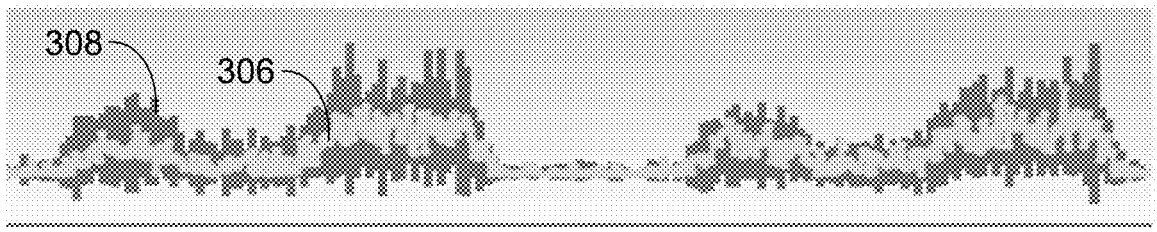

Fig. 4

| SOME ASPECTS OF PERFORMANCE INDICATOR 306, BASELINE SLEEVE 308, OR ADAPTIVE DATABASE COMPACTION 214 |
|---|
| SLEEVE TIME PERIOD 502 · ALLOC UNIT 544 COUNT 546 · NORMAL RANGE 504 |
| NUMBER 506 OF DATABASE RECORDS 318 IN BASIS 508 · DATABASE RECORD SIZE 510, E.G., AVERAGE 512 OR ACTUAL 514 |
| PRIMARY REPLICA SIZE 516 IN NDRS · FULLY COMPACT IN RANGE 518 |
| LOGICAL 520 TO PHYSICAL 522 RATIO 524 · SNAPSHOT 526 VALUES 528 |
| KERNEL OVERHEAD 530: FIXED 532, OR BASED ON FILE 534 COUNT 536 |
| ALERT 538 · COMPACTION DECISION 540 · SECURE SHELL PUBLIC KEY 542 |

Fig. 5

| SOME EXAMPLES OF TRIGGER CONDITIONS 310 |
|---|
| CONDITION 602: PERFORMANCE INDICATOR VALUE(S) LIE OUTSIDE SLEEVE AT LEAST THRESHOLD 604 TIMES IN TRIGGER TIME PERIOD 606 |
| CONDITION 608: PERFORMANCE INDICATOR VALUE(S) HAVE NEGATIVE TREND 610 AT OR PAST TRIGGER TREND THRESHOLD 612 |
| CONDITION 614: PERFORMANCE INDICATOR VALUE(S) AT OR PAST TRIGGER MAGNITUDE THRESHOLD 616 |

Fig. 6

ADAPTIVE DATABASE COMPACTION

BACKGROUND

Noon Data is often organized in a database which can be stored, retrieved, indexed, updated, copied, read from, written into, and otherwise processed electronically using one or more computer systems. Relational databases which model data as rows and columns in tables are among the most widely used databases, but many non-relational databases are also in use. Database administrators and other database users may use a database management system (DBMS) program to define, populate, control access, and otherwise maintain a database. A data description language (a.k.a. "data definition language") may be used to create or modify database objects such as those that describe tables, indexes, or users. Database administrators and other database users may also use a query language in order to find and extract data from a database.

The foregoing is merely an introduction, as there are many other aspects to databases, and many nuances. Regardless, it may now be apparent that improvements in database technology can be worth considering.

SUMMARY

Some embodiments described in this document provide improved technology for database compaction; a compaction performs operations which close storage device gaps between parts of a database. Compaction requires processing and other computational resources, but tends to reduce data retrieval time and also tends to reduce database storage requirements. Some of the embodiments facilitate automatic identification of situations in which compaction would be especially beneficial. Some embodiments implement a tunable automatic balance between the computational costs of compaction and the costs of continued database use without compaction.

Some embodiments use or provide a high-availability database hardware and software combination which includes a digital memory, and a processor which is in operable communication with the memory. The digital memory has at least a nonvolatile database record storage portion (NDRS) and a processor working memory portion (PWM). The NDRS holds a primary replica of the database and at least one secondary replica of the database, and each replica holds database records. The processor is configured, e.g., by tailored software, to perform adaptive database compaction steps.

In this example, the adaptive database compaction steps may include (a) maintaining over a sleeve time period a baseline sleeve which represents a normal range of a performance indicator, (b) tracking values of the performance indicator, (c) initiating compaction of the secondary replica when a compaction trigger based on the performance indicator occurs, and (d), demoting the primary replica and promoting the compacted secondary replica.

In operation, an embodiment maintains database availability during compaction, and the embodiment also automatically adaptively balances compaction computational cost against a storage cost imposed by database fragmentation. In some embodiments, the balance may be tuned by altering user-defined items, as described herein.

Some embodiments use or provide steps of a method for adaptive database compaction. The steps may include automatically maintaining over a sleeve time period a baseline sleeve which represents a normal range of a performance indicator, tracking values of the performance indicator, detecting a compaction trigger which is based at least partially based on the performance indicator, initiating compaction of a secondary replica of the database in response to detecting the compaction trigger, promoting the compacted secondary replica and demoting the primary replica. The method automatically adaptively balances compaction computational cost against at least a storage cost imposed by database fragmentation.

Some embodiments use or provide a computer-readable storage medium configured with data and instructions, or use other computing items, which upon execution by a processor cause a computing system to perform a method to perform a method for adaptive database compaction. In particular, some embodiments include maintaining over a sleeve time period a baseline sleeve which represents a normal range of a performance indicator, tracking values of the performance indicator, detecting a compaction trigger which is based at least partially based on the performance indicator, raising a compaction alert in response to detecting the compaction trigger, receiving a compaction decision in response to raising the compaction alert, and implementing the compaction decision.

In some embodiments, the compaction decision is implemented as follows. When the compaction decision calls for an immediate compaction, the embodiment initiates compaction of a secondary replica of the database. When the compaction decision calls for a delayed compaction, then the embodiment initiates compaction of a secondary replica of the database after a delay condition that is specified by the compaction decision has been satisfied, e.g., by waiting for a resource to become available, waiting for a usage level to drop sufficiently, or waiting a specified delay to allow logoffs and other preparations. When the compaction decision calls for no immediate compaction, then the embodiment avoids initiating compaction of the database in response to the compaction alert.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a graph illustrating values of a performance indicator and a baseline sleeve over time;

FIG. 5 is a block diagram illustrating some aspects of performance indicators, baseline sleeves, and adaptive database compaction;

FIG. 6 is a block diagram illustrating some examples of adaptive database compaction trigger conditions;

DETAILED DESCRIPTION

Overview

Figure 1:
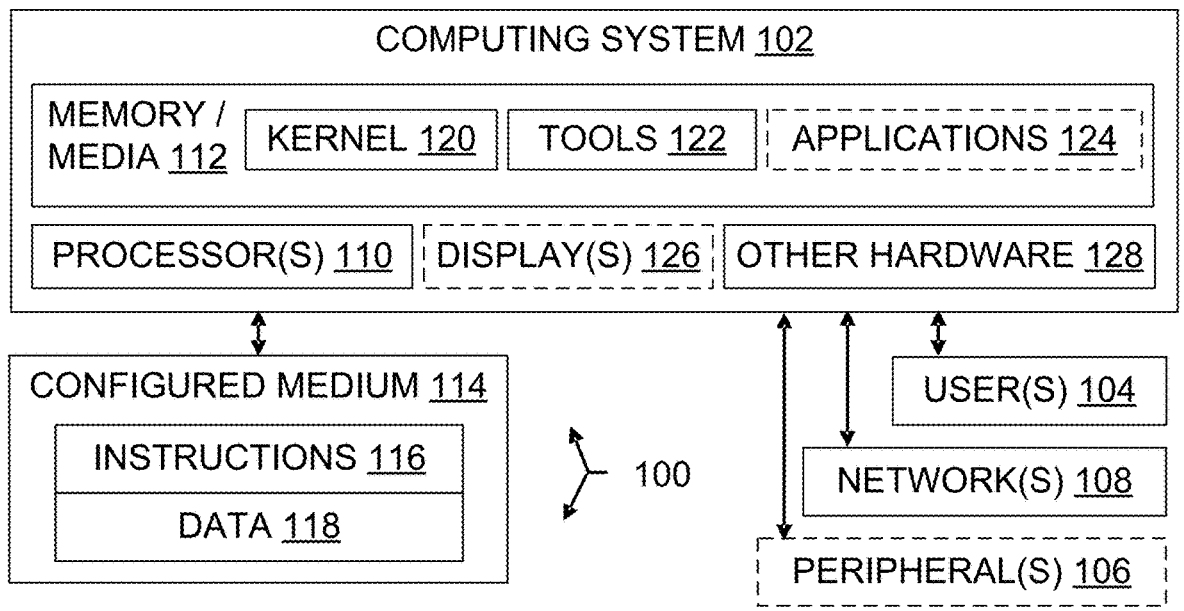
FIG. 1 is a block diagram illustrating computer systems generally and also illustrating configured storage media generally.
Figure 2:
FIG. 2 is a block diagram illustrating a computing system equipped with adaptive database compaction functionality, and some aspects of a surrounding context.

Innovations may expand beyond their origins, but understanding an innovation's origins can help one more fully appreciate the innovation. In the present case, some teachings described herein were motivated by technical challenges faced by Microsoft innovators who were working to improve the feature set and usability of Microsoft database offerings, including some versions of Microsoft Azure® cloud service environments (marks of Microsoft Corporation).

Initially, the innovators recognized that manual ad hoc efforts to manage database fragmentation impose substantial administrative burdens, with a high risk of inconsistency over time and a related risk of missed opportunities for efficiency optimization. The innovators faced several technical challenges in their pursuit of innovations to improve database compaction. An initial challenge was to select trackable values that correspond with opportunities for significant efficiency gains through database compaction. Addressing this challenge led the innovators to a decision to adapt a logical-to-physical ratio metric from filesystem fragmentation technology for use in database compaction.

Upon further consideration, some emergent technical challenges included how to define specific states or behaviors involving the adapted ratio so they could be automatically detected and then used as compaction triggers, how to take kernel differences into account, how to securely propagate database compaction results, and which aspects of the innovative compaction technology would be well suited for tuning by a database administrator based on compaction performance over time. One of skill will recognize these and other technical challenges of automated database compaction, as they are addressed at various points within the present disclosure.

Some embodiments use or provide a high-availability database hardware and software combination which includes a digital memory, and a processor which is in operable communication with the memory. The digital memory has at least a nonvolatile database record storage portion (NDRS) and a processor working memory portion (PWM). The NDRS holds a primary replica of the database and at least one secondary replica of the database, and each replica holds database records. Records may be relational database table rows, documents in a non-relational XML database, objects, tuples, key-value pairs, graph nodes, or other database units defined for query or storage. The processor is configured to perform adaptive database compaction steps.

In this example, the adaptive database compaction steps may include (a) maintaining over a sleeve time period a baseline sleeve which represents a normal range of a performance indicator, (b) tracking snapshot values of the performance indicator, (c) initiating compaction of the secondary replica when a compaction trigger based on the performance indicator occurs, and (d), demoting the primary replica and promoting the compacted secondary replica.

In some embodiments, the performance indicator is based on at least the following with regard to a proper subset of a database: a number of database records, a database record size, and a size of a primary replica of the database in a nonvolatile database record storage portion of digital data storage hardware. In some, database record size is an actual record size for one or more particular records, and in some the database record size is an average, a sampling, a projection, or another statistical measure.

Other aspects of these embodiments, and other database compaction enhancement embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, database administrators, security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" (and "execution") are used in a broad sense herein to include (running) machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to one or more of: another networked device, a remote cloud, an enterprise network, or the Internet. In particular, adaptive database compaction functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

FIGS. 2 through 7 illustrate an environment having an enhanced system 202, 102 with adaptive database compaction functionality 204. The illustrated system 202 has a processor 110 and a memory 112 (as used herein, memory 112 refers to volatile memory, nonvolatile memory, or both, depending on context). The memory 112 includes at least two portions. A processor working memory 206 portion (PWM) is in operable communication with the processor, e.g., to hold software instructions 116 and to hold data 118 from intermediate or final calculations created or modified as the processor executes instructions 116. A nonvolatile database record storage 208 portion (NDRS) holds a database 210 in the form of two or more replicas 212. Copies or parts of the database 210 may also reside in volatile memory at some points in time, and nonvolatile memory in the system may hold more than the database replicas.

Database compaction 214 involves reorganizing the database so that it is stored in fewer or smaller (or both) allocation units of the NDRS. For example, in some cases a database 210 resides in a cloud 216, such as in blob 218 allocation units of a cloud blob storage 220 (clouds may also use other allocation units consistent with the teachings herein). Compaction 214 then involves reorganizing the database 210 so that it is stored in fewer or smaller (or both) blob allocation units 218 of the NDRS portion 208 of the cloud blob storage 220, 218.

Some database systems 202 include a database management system 222 (DBMS). A DBMS 222 may be or include off-the-self commercially available software which performs database management operations such as creating a database, creating one or more database tables, creating one or more database records, creating one or more database secondary replicas, designating a replica as primary or as secondary, defining indexes, modifying database content, tracking database statistics, backing up or restoring a database, setting database access permissions, and other administrative operations.

The teachings provided herein can be applied to enhance many kinds of databases 210 and DBMSs 222, including in particular very large or enterprise databases 210, and databases 210 residing in cloud environments 216. Likewise, although particular database vendors may be used as examples, the teachings provided herein can be applied to enhance compaction of databases from most if not all vendors.

Figure 3:
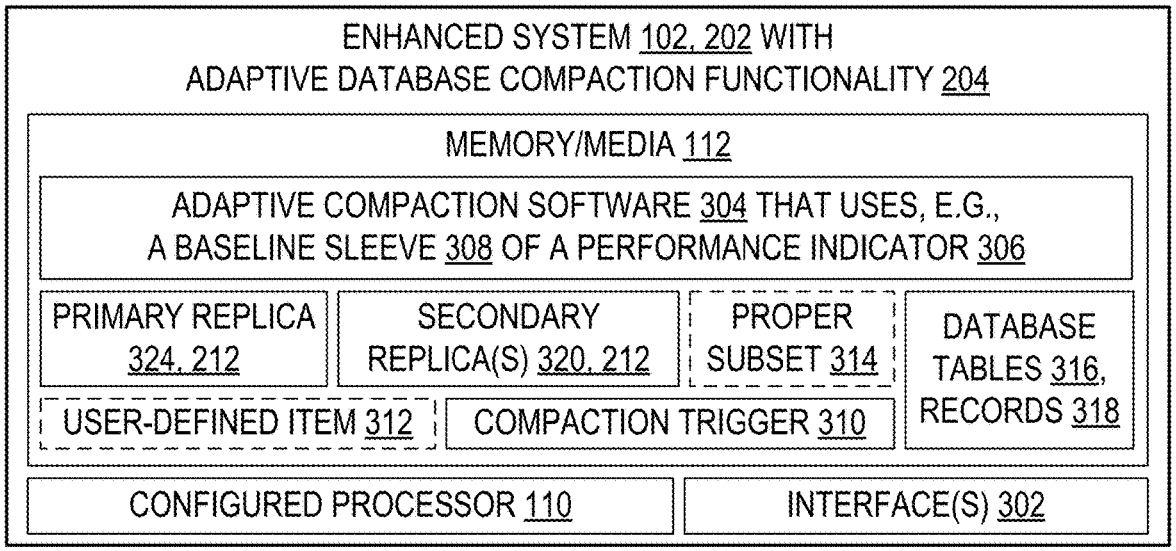
FIG. 3 is a block diagram illustrating an enhanced computing system configured for adaptive database compaction.

FIG. 3 illustrates an enhanced system 202 which is configured with adaptive database compaction functionality 204. The system 202 may be networked generally or communicate via network packets, shared memory, shared files, or otherwise with a cloud, other network(s) 108, and other computing devices through one or more interfaces 302. An interface 302 may include hardware such as network interface cards, software such as network stacks, APIs, or sockets, combination items such as network connections, or a combination thereof.

The illustrated system 202 includes adaptive database compaction software 304, also referred to as "adaptive compaction software" since the relationship of compaction to a database is in the context herein. The adaptive compaction software 304 may perform operations such as tracking a database performance indicator 306, computing a baseline sleeve 308, comparing the performance indicator 306 to the baseline sleeve 308 according to one or more defined compaction triggers 310, and interacting with an administrator 104 to obtain compaction tuning values in the form of user-defined items 312. In particular, the adaptive compaction software 304 may perform a method 900 illustrated in one or more of FIGS. 8-10.

In the course of these operations, the adaptive compaction software 304 may utilize a proper subset 314 of the database as a basis for computing the baseline sleeve 308. Some embodiments base the sleeve, e.g., on a defined number of the largest tables 316 in the database, a defined number of the largest records 318 in the database, a defined number of the most recently accessed records 318 in the database, or another proper subset 314. Other embodiments base the sleeve 308 on the entire database 210.

In the course of operation, the adaptive compaction software 304 may access a primary replica 324, 212 of the database or a secondary replica 320, 212 of the database, or both. The adaptive compaction software 304 may also demote a primary replica 324 to make it be a secondary 320, and may promote a secondary replica 320 to make it be a primary 324. These accesses and promotions or demotions may also be initiated by the adaptive compaction software 304 and then completed by other software such as the DBMS 222.

FIG. 4 shows graphs of performance indicator 306 values over time, as compared with a graph over time of a baseline sleeve 308. This graphical representation is one of many possible ways to visually present performance indicator 306 values and baseline sleeve 308 boundaries. A set of discrete points could be used instead of continuous lines, for instance. Moreover, a given embodiment does not necessarily visually present performance indicator 306 values or baseline sleeve 308 boundaries.

Figures 7, 8:
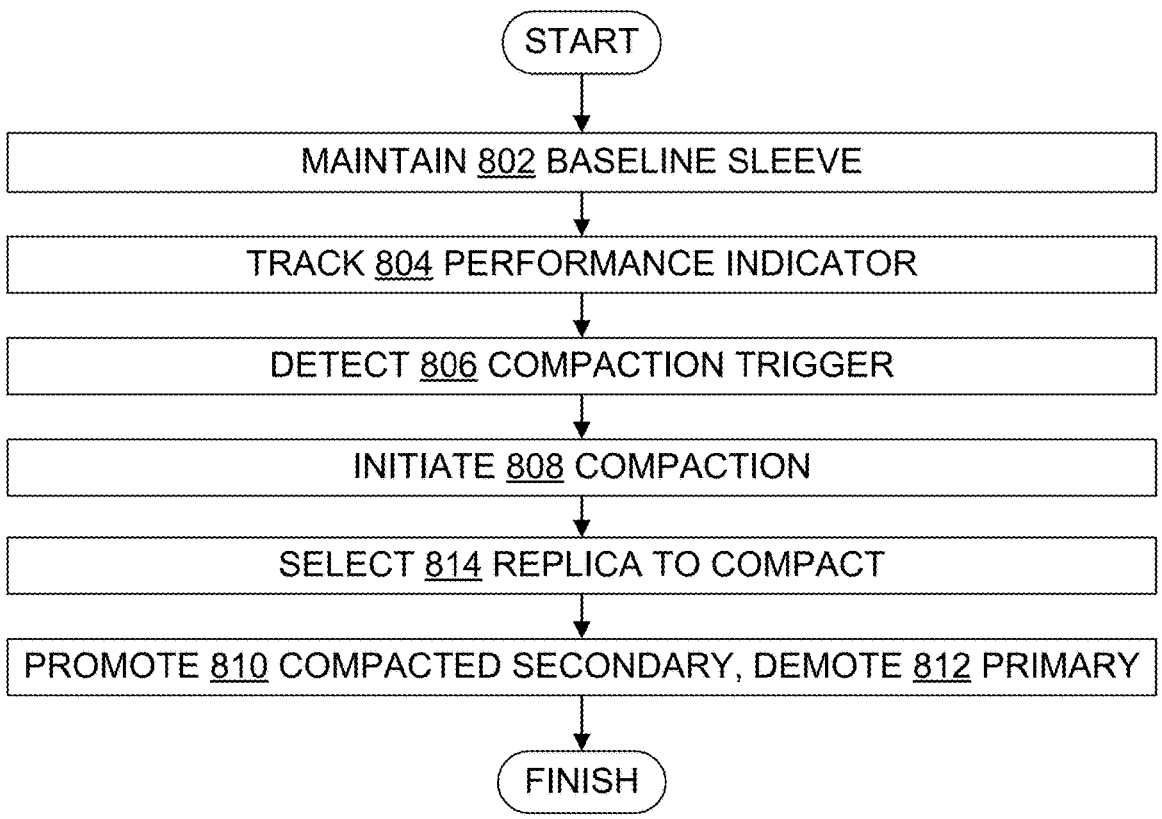
FIG. 7 is a block diagram illustrating some examples of user-defined items for tuning adaptive database compaction.
FIG. 8 is a flowchart illustrating steps in some adaptive database compaction methods.

FIG. 5 illustrates some aspects of performance indicators 306, baseline sleeves 308, and adaptive compaction 214. FIG. 6 illustrates some examples of compaction trigger conditions 310 (also referred to as "compaction triggers" 310). FIG. 7 illustrates some examples of user-defined items 312. The aspects, examples, and items illustrated in these Figures are discussed at various points herein, and additional details regarding them are provided in the discussion of a List of Reference Numerals later in this disclosure document.

With reference now to all of the drawing figures, some embodiments use or provide a functionality-enhanced system, such as system 202 or another system 102 that is enhanced as taught herein. In some embodiments, a database system 202 fora high-availability database 210 includes a digital memory 112, and a processor 110 in operable communication with the memory. The memory 112 has at least a nonvolatile database record storage portion (NDRS) 208 and a processor working memory portion (PWM) 206, with the NDRS holding a primary replica 324, 212 of the database and at least one secondary replica 320, 212 of the database. Each replica 212 holds database records 318.

In this example, the processor 110 is configured to perform adaptive database compaction steps. The steps may include (a) maintaining 802 over a sleeve time period 502 a baseline sleeve 308 which represents a normal range 504 of a performance indicator 306, the performance indicator based 508 on at least the following with regard to a proper subset 314 of the database: a number 506 of database records 318, a database record size 510, and a size 516 of the primary replica in the NDRS, (b) tracking 804 snapshot values 528 of the performance indicator 306, (c) initiating 808 compaction 214 of the secondary replica 320 when a compaction trigger 310 occurs, the compaction trigger based on the performance indicator, and (d) after the secondary replica is compacted, demoting 812 the primary replica and promoting 810 the compacted secondary replica. Accordingly, the database system 202 maintains 902 database availability during compaction 214 and automatically adaptively balances 904 compaction computational cost against a storage cost imposed by database fragmentation.

Various examples of trigger conditions 310 are provided herein, and others may also be used in a manner consistent with the teachings provided herein. In some embodiments, the compaction trigger occurs in response to at least one of the following conditions 602, 608, 614.

Under a condition 602, one or more snapshot values 528 of the performance indicator lie outside the baseline sleeve 308 at least a predefined number 604 of times within a predefined trigger time period 606. Accordingly, some embodiments automatically generate an abnormal event 538 if an LP ratio 524, 306 value is outside the normal range defined by the sleeve.

Under a condition 608, multiple snapshot values 528 of the performance indicator have a negative trend at or are past a predefined trigger trend threshold 612. Accordingly, some embodiments automatically generate an abnormal event 538 if an LP ratio 524, 306 keeps going down, as this indicates regular space reclaim is not sufficient and full compaction would be worthwhile.

Under a condition 614, at least one snapshot value 528 of the performance indicator is at or past a predefined trigger magnitude threshold 616. For instance, in some embodiments, compaction is triggered when an LP ratio 524, 306 is down by 20% from its value in a fully compacted database status, and in some compaction is triggered when an LP ratio 524, 306 is at or below 0.8 in an implementation where LP is 1 for a fully compacted database.

The benefits of some adaptive compaction embodiments may be greatest with very large databases, and such databases are often stored in a cloud 216. Accordingly, in some embodiments the NDRS 208 includes cloud blob storage 220, 218.

In some embodiments, the performance indicator 306 is based on the N largest tables of the database. Some embodiments have N=5, but other embodiments may use a different number of tables. In some embodiments, the proper subset 314 of the database consists of the N largest tables in the database, and N is in the range of 1 to 10. Some embodiments, particularly those for non-relational databases 210, may define a proper subset 314 in terms of database content other than tables, e.g., XML documents or key-value pairs or other records 318.

Different computing and storage environments may have different amounts of overhead. In some embodiments, these differences are recognized by including a kernel overhead amount 530 in the calculation of the performance indicator 306. As used here, a "kernel" includes an operating system, hypervisor, file system, and similar low-level system software. In particular, a kernel 120 may include any system software that is relied upon by a DBMS 222. Accordingly, in some embodiments, which include a database management system (DBMS) 222 and a kernel 120, the DBMS is configured to execute using the kernel, and the performance indicator is based at least partially on a kernel overhead 530 which is dependent on the kernel.

Some embodiments allow tuning of the compaction functionality 204 through setting values for certain user-defined items 312. The number of available user-defined items 312 may vary between embodiments. Some embodiments provide at least M of the following user-defined items 312, where M is a value in the range from 1 to the number of user-defined items 312 listed herein. In some embodiments, each user-defined item is present in the system 202, and each user-defined item is definable by a user 104 of the system 202 through a file or a command line or an application program interface or a graphical user interface.

One user-defined item 312 may be a performance indicator calculation interval 702 which specifies how frequently the performance indicator is calculated while tracking the performance indicator. For instance, the performance indicator may be calculated at five minute intervals, at one hour intervals, or at some other interval 702.

One user-defined item 312 may be the sleeve time period 502 which specifies how much performance indicator historic data is used in calculating the baseline sleeve. For instance, the past three months of historic data may be used in calculating the baseline sleeve, or a different sleeve time period 502 may be used.

One user-defined item 312 may be a sleeve calculation interval 704 which specifies how frequently the baseline sleeve is calculated. For instance, the baseline sleeve may be calculated at hourly intervals, at six hour intervals 704, at eight hour intervals 704, daily 704, or at another interval 704.

One user-defined item 312 may be a sleeve width 706 which specifies an extent of values that lie within the sleeve at a given point in time. For instance, the sleeve width 706 may be two standard deviations from the performance indicator baseline, or may have another width 706.

One user-defined item 312 may be a sleeve exit count trigger 604 which operates as a compaction trigger when one or more snapshot values of the performance indicator lie outside the baseline sleeve at least the sleeve exit count trigger number of times within a predefined trigger time period 606. For instance, the sleeve exit count trigger 604 may be one, with the trigger time period 606 being any period. Or a different sleeve exit count trigger 604 may be used.

One user-defined item 312 may be a sleeve exit count time period 606 which supports a compaction trigger when one or more snapshot values of the performance indicator lie outside the baseline sleeve at least the sleeve exit count trigger number of times within the sleeve exit count time period.

One user-defined item 312 may be a trend threshold trigger 612 which operates as a compaction trigger when multiple snapshot values of the performance indicator have a negative trend at or past the trend threshold trigger. For instance, the trend may be a negative slope of at least one, or a negative slope of at least two, or another trend threshold trigger 612 may be used.

One user-defined item 312 may be a magnitude threshold trigger 616 which operates as a compaction trigger when at least one snapshot value of the performance indicator has a value at or past the magnitude threshold trigger.

One user-defined item 312 may be a table count 708 which specifies how many database tables are in the proper subset of the database upon which the performance indicator is based.

One user-defined item 312 may be a replica count 710 which specifies how many replicas of the database are created.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, DBMS capabilities, compaction operation sequences, database or other data structures, thresholds, or GUI presentation functionalities, for instance, and may otherwise depart from the examples provided herein.

Processes (a.k.a. Methods)

Figure 9:
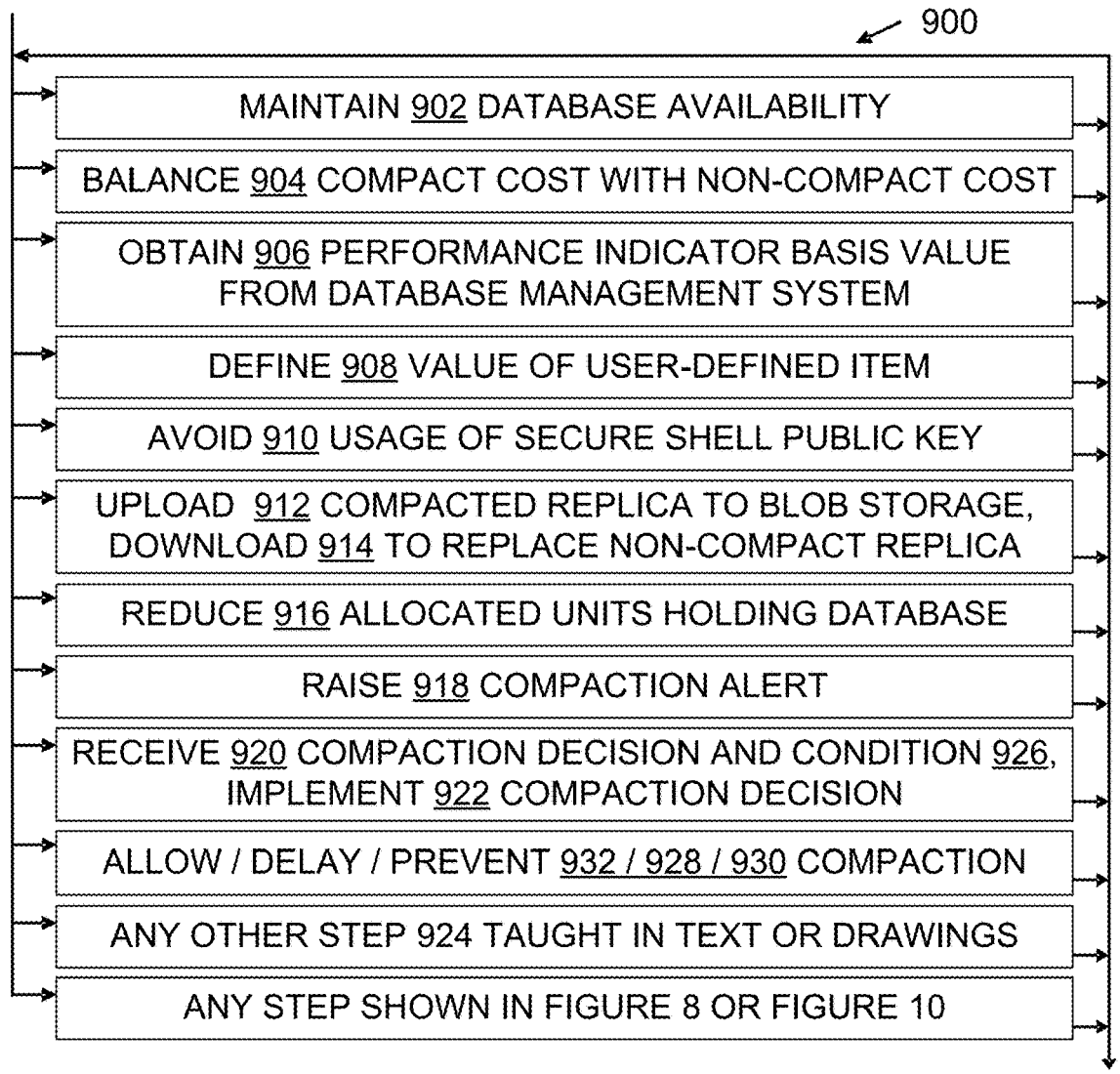
FIG. 9 is a flowchart further illustrating steps in some adaptive database compaction methods.

FIG. 8 illustrates a family of adaptive database compaction methods 800 that may be performed or assisted by an enhanced system, such as system 202 or another functionality 204 enhanced system as taught herein. FIG. 9 further illustrates adaptive database compaction methods 900 (which may also be referred to as "processes" in the legal sense of that word) that are suitable for use during operation of a system which has innovative functionality taught herein. FIG. 9 includes some refinements, supplements, or contextual actions for steps shown in FIG. 8, as well as methods which do not necessarily involve steps of FIG. 8.

FIG. 9 as a whole does incorporate all steps shown in FIG. 8, as steps that may be part of a particular embodiment.

Technical processes shown in the Figures or otherwise disclosed will be performed automatically, e.g., by an enhanced system 202 or software component thereof, unless otherwise indicated. Processes may also be performed in part automatically and in part manually to the extent activity by a human person is implicated. For instance, in some situations a database administrator 104 may manually enter one or more tuning values 312. However, no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 or flowchart 900 operation items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method 900 for adaptive database compaction that is suitable for performance by an enhanced computing system 202, including the following steps: maintaining 802 over a sleeve time period 502 a baseline sleeve 308 which represents a normal range 504 of a performance indicator 306, the performance indicator based on at least the following with regard to a proper subset 314 of a database 210: a number 506 of database records 318, a database record size 510, and a size 516 of a primary replica 324 of the database in a nonvolatile database record storage portion 208 of digital data storage hardware 112; tracking 804 snapshot values 528 of the performance indicator; detecting 806 a compaction trigger 310 which is based at least partially based on the performance indicator; initiating 808 compaction 214 of a secondary replica 320 of the database in response to detecting the compaction trigger; after the secondary replica is compacted 214, promoting 810 the compacted secondary replica and demoting 812 the primary replica. Accordingly, the method 900 automatically adaptively balances 904 compaction computational cost against a storage cost imposed by database fragmentation.

In some embodiments, the performance indicator is also based on at least one of the following: a kernel overhead value 530 which is fixed 532 for a given kernel 120, a kernel overhead value 530 which depends on a count 536 of files 534 used, or a ratio 524 whose numerator depends on a database record size 510 and a database record count 506 and whose denominator depends on a number 546 of allocated units 544 (e.g., blobs 218, bytes, sectors, or blocks) in the nonvolatile database record storage portion 208.

In some embodiments, the method 900 is further characterized in at least one of the following ways.

In a characterization denoted here as Tuning-1, a performance indicator calculation interval 702 specifies how frequently the performance indicator is calculated while tracking 804 the performance indicator, and the performance indicator calculation interval is in a range from one minute to one hundred twenty minutes. A particular example of Tuning-1 uses a calculation interval 702 of sixty minutes, and another example calculation interval 702 is five minutes. Some other embodiments use ad hoc or pseudo-random calculation intervals 702.

In a characterization denoted here as Tuning-2, the sleeve time period 502 is in a range from one week to six months. A particular example of Tuning-2 uses a sleeve time period 502 of three months. Some other embodiments use ad hoc or pseudo-random sleeve time periods 502.

In a characterization denoted here as Tuning-3, a sleeve calculation interval 704 specifies how frequently the baseline sleeve 308 is calculated, and the sleeve calculation interval is in a range from twelve hours to one week. A particular example of Tuning-3 uses a calculation interval 704 of sixty minutes, and another example calculation interval 704 is five minutes. Some other embodiments use ad hoc or pseudo-random calculation intervals 704.

In a characterization denoted here as Tuning-4, a sleeve width 706 specifies an extent of values that lie within the sleeve 308 at a given point in time, and the sleeve width is in a range from one-half standard deviation to three standard deviations from the snapshot values 528 of the performance indicator 306. A particular example of Tuning-4 uses a sleeve width 706 of two standard deviations. FIG. 4 illustrates a method which has the Tuning-4 characterization. Some other embodiments use ad hoc sleeve widths 706.

Some embodiments use secure file transfer protocol (SFTP) for operations such as copying performance indicator values 528, copying baseline sleeve 308 updates, or distributing copies of a compacted 214 secondary replica 320. SFTP may in turn use a secure shell (SSH) public key 542. However, some other embodiments perform a method 900 without usage of an SSH public key 542, e.g., by utilizing Azure® secure blob storage 220, 218 data transfer functionality, or another secure data transfer functionality that does not rely on SSH public key usage (mark of Microsoft Corporation).

Some embodiments use blob storage 220, 218 as a staging area. One benefit of compaction is storage size reduction, whether it be reduction in blob storage or other storage 112. In some embodiments, a method 900 includes uploading 912 the compacted secondary replica 320 to a blob storage 220, 218, and downloading 914 copies of the compacted secondary replica to replace less-compact replicas of the database 210, thereby reducing 916 the number of allocated units 544 in the nonvolatile database record storage portion 208 which hold the database.

In some embodiments, a fully compacted database replica has an LP ratio 524 near or at 1. Thus, in some embodiments a value of the performance indicator 306 which is based only on the compacted secondary replica is in the range from 0.9 to 1.1.

Some embodiments leverage DBMS functionality. For example, in some embodiments, the method 900 includes obtaining 906 at least one of the following from an interface 302 to a database management system 222: the number 506 of database records 318, or an average database record size 512.

In some embodiments, the method 900 includes raising 918 a compaction alert 538 in response to detecting 806 the compaction trigger 310. The alert may lead to an automatic compaction, or to a decision from a human administrator regarding compaction.

Some embodiments support compaction of on-premises databases 210. However, in some the database 210 resides at least partially in cloud storage 220, such as cloud blob storage 218, 220.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as adaptive compaction software 304, baseline sleeves 308, performance indicators 306, compaction triggers 310, tuning items 312, proper subset 314 definitions, database replicas 212, alerts 538, and compaction decisions 540, in the form of data 118 and instructions 116, read from a removable storage medium 114 and/or another source such as a network connection, to form a configured storage medium. The configured storage medium 112 is capable of causing a computer system 102 to perform technical process steps for adaptive compaction functionality 204, as disclosed herein. The Figures thus help illustrate configured storage media embodiments and process (a.k.a. method) embodiments, as well as system and process embodiments. In particular, any of the process steps illustrated in FIG. 8, 9, or 10 or otherwise taught herein, may be used to help configure a storage medium to form a configured storage medium embodiment.

In some embodiments compaction is not automatic when a trigger 310 is detected 806. Instead, a human administrator 104 or a compaction software admin tool 122, 304 gets an alert and decides whether to compact 214 right away, or to wait and then compact after some condition 926 is satisfied, or to not compact yet despite this particular alert.

Some embodiments use or provide a computer-readable storage medium 112, 114 configured with data 118 and instructions 116 which upon execution by at least one processor 110 cause a computing system to perform a method for adaptive database compaction. This method includes: maintaining 802 over a sleeve time period a baseline sleeve which represents a normal range of a performance indicator; tracking 804 snapshot values of the performance indicator; detecting 806 a compaction trigger which is based at least partially based on the performance indicator; raising 918 a compaction alert in response to detecting the compaction trigger; receiving 920 a compaction decision in response to raising the compaction alert; and implementing 922 the compaction decision.

In some embodiments, the performance indicator is based 508 on at least the following with regard to a proper subset of a database: a number of database records, a database record size, and a size of a primary replica of the database in a nonvolatile database record storage portion of digital data storage hardware.

In some embodiments, the compaction decision 540 is implemented 922 as follows. When the compaction decision calls for an immediate compaction, then implementation includes promptly (e.g., within one minute) initiating 808 compaction of a secondary replica of the database. When the compaction decision calls for a delayed compaction, then implementation includes initiating compaction of a secondary replica of the database after 928 a delay condition 926 that is specified by the compaction decision has been satisfied. When the compaction decision calls for no immediate compaction, then implementation includes avoiding 930 initiating compaction of the database in response to the compaction alert.

In some embodiments, the method 900 further includes operating the computing system according to at least N of the following user-defined items: a performance indicator calculation interval 702 which specifies how frequently the performance indicator is calculated while tracking the performance indicator, the sleeve time period 502 which specifies how much performance indicator historic data is used in calculating the baseline sleeve, a sleeve calculation interval 704 which specifies how frequently the baseline sleeve is calculated, a sleeve width 706 which specifies an extent of values that lie within the sleeve at a given point in time, a sleeve exit count trigger 604 which operates as a compaction trigger when one or more snapshot values of the performance indicator lie outside the baseline sleeve at least the sleeve exit count trigger number of times within a predefined trigger time period, a sleeve exit count time period 606 which supports a compaction trigger when one or more snapshot values of the performance indicator lie outside the baseline sleeve at least the sleeve exit count trigger number of times within the sleeve exit count time period, a trend threshold trigger 612 which operates as a compaction trigger when multiple snapshot values of the performance indicator have a negative trend at or past the trend threshold trigger, a magnitude threshold trigger 616 which operates as a compaction trigger when at least one snapshot value of the performance indicator has a value at or past the magnitude threshold trigger, a table count 708 which specifies how many database tables are in the proper subset of the database upon which the performance indicator is based, or a replica count 710 which specifies how many replicas of the database are created. In particular, N may be two or four or six or eight, but more generally N may be in the range from one to ten.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide an adaptive learning approach to database compaction that reduces total cost of ownership (TCO) and improves return on investment (ROI). This adaptive database compaction can be implemented for virtually any database 210, including cloud databases, large databases, and distributed databases (categories that one of skill will acknowledge may overlap). Some embodiments optimize database compaction on behalf of a database vendor in very large scalable database environment, such as cloud vendors that support database-as-a-service solutions in a highly secured environment.

Unlike alternatives such as compacting at fixed time intervals, or compacting on a manual and ad hoc basis, adaptive database compaction as taught herein can be largely or fully implemented by automation and thereby reduce burdens on administrative personnel 104. Despite this ease of administration, a given embodiment can be tuned 908 over time to provide even better performance. Moreover, some embodiments can respond promptly to sudden changes in a database's amount of fragmentation, such changes caused by the deletion of many records from multiple tables or updates to values of an indexed column. In addition, some embodiments operate without requiring system resources such as mutexes. Some operate without direct negative impact on an end user service application, such as availability that falls low enough to violate a high-performance service level agreement (SLA) target.

In some embodiments, online compaction is reduced or eliminated. In some, this is accomplished in part by triggering compaction of a secondary replica in response to a trigger value of an LP ratio 524. The LP ratio is calculated with offline baseline calculations for a proper subset of the database, such as by using the following formula:

$$LP = \frac{((\text{\# records}) * (\text{average record size}) + (\text{kernel overhead}))}{(\text{physical size on disk})} \quad (1)$$

The proper subset may be, e.g., the top five biggest tables in the database. Note that LP may also be calculated using this formula for non-relational databases, e.g., by using the top M largest XML documents in an XML database, or the top K largest records in any database. Kernel overhead may also be referred to as "OS overhead" or "operating system overhead" or "filesystem overhead", and may mainly reflect metadata that was added to data files by the kernel. Size "on disk" refers to size in nonvolatile storage.

Some embodiments use the LP score or another performance indicator 306 to continuously calculate 802 a baseline sleeve 308. New LP calculations are compared with an existing offline baseline model. The LP and baseline sleeve may be graphically overlaid, as shown in FIG. 4. An automatic abnormal event 538 is generated 918 if LP value is outside the normal range 504 defined by the sleeve. This may also be referred to as an alert or an anomaly. For example, assume the LP at 7 PM on the 13th of the month for each of the past three months is around 56. If a new LP calculation on the current month's 13th day during the 7 PM-8 PM period differs by more than a defined threshold from 56, more than a defined number of times, then a given embodiment may raise 918 an alert.

This kind of adaptive approach is useful to alert administrators or admin tools about a worthwhile opportunity for compaction, after a massive delete has taken place on the underlying tables, for example. In addition, or alternately, an embodiment may alert for compaction when an LP ratio or other performance indicator keeps going down, as that could be interpreted to mean that regular space reclaim isn't enough and full compaction would be worthwhile. If the adaptive calculation process finds continuous breaches, an embodiment may send an internal event for starting compaction service on a replica set 1002.

Figure 10:
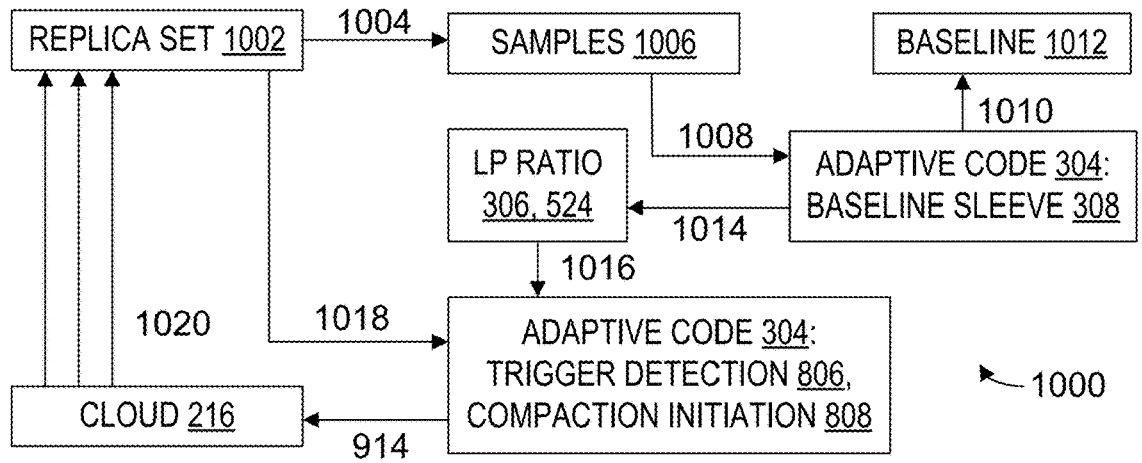
FIG. 10 is a data flow diagram illustrating aspects of some architectures for adaptive database compaction.

As shown in FIG. 10, in some environments 1000 a database includes a replica set 1002 containing multiple replicas 212. To ensure high-availability, multiple copies 212 of the data 118 are stored. A currently active node which handles new data is denoted as a primary replica 324, and nodes which only hold data for availability are noted secondary replicas 320. All writes go to the primary, so any performance impact on that primary node would likely have high impact on the system performance, which could lead to an SLA violation. To avoid adverse impact that risks SLA violation, the system 1000, 202 will perform compaction 214 process on a secondary replica 320 and then propagate the compacted replica.

Some embodiments choose a server with the least fragmented data (one whose LP value is closest to 1 in this example) as the source server for replica set compaction. This choice helps reduce or minimize overall compaction processing time. The embodiment takes the chosen server offline from the replica set, and compaction per se proceeds using available DBMS or filesystem or other compaction functionality.

Once the system 1000, 202 has a compacted copy 212 of the database data, the system utilizes cloud blob storage 220, 218 functionality to securely upload 912 and distribute 914 the compacted copy to the remaining replicas. Then the primary node 324 will failover to a compacted replica 212, at which point the users will start gaining the benefits of compaction. The original primary (now demoted 812 to secondary status) is free to acquire the compacted copy of data from the cloud blob storage. One benefit of compaction is that the performance of ad hoc queries tends to be improved, since both the data retrieval times and the retrieved data transmission times tend to be reduced as the desired data fits in fewer storage allocation units.

Utilizing cloud blob storage 220, 218 for upload and download of the compacted replicas can provide several benefits. One potential benefit is a high degree of parallelism, enabling relatively rapid distribution of compaction results to all replicas concurrently. Another potential benefit is high distribution performance even for a given particular replica, as blob storage may provide very high throughput compared to a single server. Another potential benefit is secure data transfer using familiar data transfer tools.

FIG. 10 illustrates an advanced compaction architecture 1000 and data flow process 900. Adaptive compaction software 304 samples 1004 one or more replicas 212 of a replica set 1002, and uses 1008 the samples 1006 to compute 1010 a baseline 1012, from which the software 304 creates or updates a baseline sleeve 308, e.g., for a specific sleeve time period 502. The software 304 also uses the samples 1006 to calculate 1014 an LP ratio 524. The software 304 uses 1016 the LP ratio and baseline sleeve and trigger conditions 310 to detect anomalies which indicate compaction should be initiated 808.

When a compaction trigger is detected 806, the software 304 selects 814 and imports 1018 a replica, which is compacted 214 by existing functionality. In some implementations, offline compaction is run on the replica with the most extreme LP, e.g., the highest LP when that status indicates least fragmentation.

The architecture uploads 912 the compacted replica to the cloud 216, e.g., by uploading 912 it to blob storage. From there, the compact replica is propagated, e.g., by parallel or otherwise concurrent downloads 1020, 914 from blob storage.

Technical Character

The technical character of embodiments described herein will be apparent to one of ordinary skill in the art, and will also be apparent in several ways to a wide range of attentive readers. Some embodiments address technical activities such as compacting 214 databases 210, selecting database proper subsets 314, tuning 908 adaptive database compaction parameters 312, raising 918 compaction alerts 538, and tracking 804 a database performance indicator 306, each of which is an activity deeply rooted in computing technology. Some of the technical mechanisms discussed include, e.g., a baseline sleeve 308, a performance indicator 306, adaptive compaction software 304, compaction triggers 310, and compaction decision data structures 540. Some of the technical effects discussed include, e.g., automated alerts 538 when initiating database compaction 214 would likely be worthwhile, secure and rapid propagation 914 of compacted replica copies, and tuned 908 compaction initiation. Thus, purely mental processes are clearly excluded. Other advantages based on the technical characteristics of the teachings will also be apparent to one of skill from the description provided.

Some embodiments described herein may be viewed by some people in a broader context. For instance, concepts such as efficiency, promptness, security, size, and time may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically, efficiently, and effectively identify situations in which database compaction is worthwhile, and how to tune compaction initiation without unacceptable administrative burdens from ad hoc trial-and-error efforts. Other configured storage media, systems, and processes involving efficiency, promptness, security, size, or time are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, operating system environments, database models, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
IoT: Internet of Things
IP: internet protocol
LAN: local area network
OS: operating system
PaaS or PAAS: platform-as-a-service
RAM: random access memory
ROM: read only memory
SLA: service level agreement
TCP: transmission control protocol
TPU: tensor processing unit
UDP: user datagram protocol
UEFI: Unified Extensible Firmware Interface
URL: uniform resource locator
WAN: wide area network
XML: extended markup language
Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software, as well as the other examples discussed herein and any equivalents.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers), or automatically generated or automatically synthesized.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

The "execution" of a code implies compiling the code and running the compiled code, or interpreting the code; the distinction between compilers and interpreters is acknowledged herein but does not prevent beneficial application of the teachings herein with either category of code.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Adaptive database compaction operations such as calculating 802 a baseline sleeve, calculating 804 a performance indicator, detecting 806 a compaction condition is met, initiating 808 database compaction by procedure call or other electronic signaling, promoting 810 or demoting 812 a replica, and many other operations discussed herein, are understood to be inherently digital. A human mind cannot interface directly with a CPU or other processor, or with RAM or other digital storage, or with a display 126, to read and write the necessary data to perform the adaptive database compaction steps that are taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as compacting, demoting, defining, detecting, downloading, implementing, initiating, maintaining, obtaining, promoting, raising, receiving, selecting, sending, tracking, triggering, tuning, uploading, or using (and compacts, compacted, demotes, demoted, etc.) with regard to a destination or other subject may involve intervening action such as the foregoing or forwarding, copying, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., a software developer or other user of an enhanced system 202

106 peripherals 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers, or the other examples given herein, and any equivalents 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, identifier autocompletion software, simulators, fuzzers, repository access tools, version control tools, optimizers, collaboration tools, other software development tools and tool suites (including, e.g., integrated development environments), hardware development tools and tool suites, diagnostics, enhanced browsers, database management systems, database utilities, database or storage administration tools, and so on 124 applications, e.g., word processors, web browsers, spreadsheets, games, email tools, commands 126 display screens, also referred to as "displays"

128 computing hardware not otherwise associated with a reference number 106, 108, 110, 112, 114

202 enhanced computers, e.g., computers 102 (nodes 102) or computing systems 102 enhanced with adaptive database compaction functionality 204 adaptive database compaction functionality, e.g., functionality which does at least one of the following: calculates a performance indicator or performance indicator baseline or performance indicator baseline sleeve, detects 806 one or more compaction triggers, conforms with the FIG. 9 flowchart or its constituent flowchart 800, conforms with FIG. 3 or FIG. 10, or otherwise provides capabilities first taught herein 206 processor working memory, e.g., part of memory 112 of system 102 that is used directly by a processor 110

208 nonvolatile database record storage, e.g., blob storage (nonvolatile-backed), disk storage, or other nonvolatile storage which holds database records and is considered physical memory 210 database 212 database replica generally; may be primary or secondary 214 database compaction (activity; 214 also refers to result of compaction activity 216 cloud 218 blob (binary large object) data structure in cloud or other computing environment 220 cloud storage, e.g., cloud blob storage 222 database management system (despite "system" this refers to software unless otherwise indicated)

302 interface (hardware or software or both)

304 adaptive compaction software 306 performance indicator; LP ratio 524 is one example, but others may also be used, including non-ratio performance indicators based on the components taught herein 308 baseline sleeve 310 compaction trigger, e.g., a digital value or computed condition which may trigger initiation of compaction 312 user-defined item; may also be referred to, e.g., as a "tuning item" or "compaction parameter"

314 proper subset of a database, namely, less than the entire data of a database 316 database table; presumes a relational database 318 database record; intended broadly in that it does not presume a relational database 320 database secondary replica 324 database primary replica 502 sleeve time period 504 performance indicator normal range, e.g., range performance indicator is within when compaction is not deemed worthwhile 506 number of database records used in calculating performance indicator 508 values which serve as a basis for calculating performance indicator; 508 also refers to an activity of basing a performance indicator on certain values 510 database record size, e.g., in bytes or another storage unit; may be an average size or an actual size, for example 512 average database record size 514 actual database record size 516 size of a replica in the NDRS, e.g., physical size on disk 518 range of performance indicator values when a database is considered fully or essentially compacted 520 logical size, e.g., size considering underlying basis sizes but without regard to extra space consumed in NDRS due to storage being allocated in units larger than one byte 522 physical size, e.g., size actually allocated in NDRS 524 ratio of a logical size to a physical size 526 snapshot of data at a point in time 528 value of performance indicator ata point in time 530 kernel overhead 532 fixed kernel overhead; this will be an estimate in most implementations; this value is fixed for a given kernel but may be different for different kernels 534 file; also refers to variable kernel overhead, namely, an overhead amount that varies even for a given kernel because there is a per-file overhead amount that is reflected in the variable kernel overhead 534

536 number of files used to store a database replica 538 alert; may be implemented with a text message, email, pop-up, automated phone call, procedure call, interrupt, packet transmission, callback, or another electronic signaling mechanism; may also be referred to as an "event"

540 compaction decision data structure 542 secure shell public key 544 storage allocation unit, e.g., block, sector, page 546 number of allocation units 544

602 trigger condition involving performance indicator value outside baseline sleeve 604 number of times performance indicator value must be outside baseline sleeve to satisfy trigger condition 602

606 period during which performance indicator value(s) must be outside baseline sleeve to satisfy trigger condition 602

608 trigger condition involving performance indicator values with a negative trend or past a trend threshold 610 performance indicator negative trend 612 size of performance indicator negative trend, e.g., a negative slope 614 trigger condition involving performance indicator values at or past a specified size threshold 616 specified size threshold to satisfy trigger condition 614

702 performance indicator calculation interval 704 baseline sleeve calculation interval 706 baseline sleeve width or range 708 table count 710 replica count 800 flowchart; 800 also refers to adaptive database compaction methods illustrated by or consistent with the FIG. 8 flowchart 802 maintain baseline sleeve; accomplished by computation 804 track performance indicator; accomplished by computation 806 detect compaction trigger, in the sense that a trigger variable has reached or passed a certain threshold value or in the sense that an expression or other computational condition involving a trigger variable is satisfied; some examples of trigger variables are individual performance indicators and values derived from them such as trends/slopes, averages, sums, and other statistical measures; accomplished by computation 808 initiate compaction; accomplished by computation, e.g., through a procedure call, network packet transmission, or other electronic signals 810 promote a secondary replica to make it the primary replica; accomplished by computation, e.g., by altering data in a data structure that represents one or more data base replicas 812 demote the primary replica to make it a secondary replica; accomplished by computation, e.g., by altering data in a data structure that represents one or more data base replicas 814 select a replica to compact; accomplished by computation 900 flowchart; 900 also refers to adaptive database compaction methods illustrated by or consistent with the FIG. 9 flowchart (which incorporates the steps of FIGS. 8 and 10)

902 maintain database availability, e.g., perform a method 900 without violating an SLA; accomplished by computation 904 balance compaction costs against costs of not performing compaction 214; accomplished by computation 906 obtain performance indicator basis value from a DBMS; a performance indicator basis value is a value indicated in Formula 1 above or otherwise identified herein as a contribution to the value of the performance indicator 908 define the value of a user-defined item; accomplished by computation; an user-defined item value may be entered directly, e.g., through a user interface when a user types or pastes in the text of the value itself, or a value may be entered indirectly, e.g., through a user entering a file name, file path, URL, menu selection, or other identifier of one or more values, such as when a user enters a file name or other resource name and the file or other resource contains the values(s) defined for corresponding items 312

910 avoid usage of secure shell public key when transferring data to perform a method 900

912 upload a replica, especially a compacted replica 914 download a replica, especially a compacted replica 916 reduce number of allocated units holding a database replica, or reduce the size of such units, or both; accomplished by computation 918 raise a compaction alert; accomplished by computation and electronic signaling 920 receive a compaction decision data structure; accomplished by computation and electronic signaling; corresponding send is implied 922 implement a compaction decision that is represented in a compaction decision data structure; accomplished by computation 924 any step discussed in the present disclosure that has not been assigned some other reference numeral 926 compaction decision implementation condition which is specified in a compaction decision data structure 928 wait for a specified time or a specified condition to be met, before initiating compaction 214; 928 refers to the activity of waiting and to the resulting delay before compaction is initiated 930 avoid initiating compaction 214 in response to satisfaction of a compact initiation trigger condition; even though the trigger was met, compaction is not initiated in response to that trigger event 932 allow initiating compaction 214 in response to satisfaction of a compact initiation trigger condition; compaction initiation proceeds promptly, e.g., within one minute of computationally determining initiation is allowed 1000 data flow diagram; 1000 also refers to adaptive database compaction methods illustrated by or consistent with the FIG. 10 diagram 1002 set of database replicas; all replicas in a set represent the same database, but they are not necessarily all current 1004 activity of sampling data from a database replica, which is accomplished by computation 1006 sample of data 118 from a database replica 1008 usage of database sample(s) during computation 1010 computation of baseline from database sample(s); "computation" includes creation or modification of data structures here and elsewhere herein 1012 baseline, which may be expanded in range to form baseline sleeve 1014 calculate an LP ratio; this is an example of tracking 804 a performance indicator 1016 computational usage of LP ratio and baseline sleeve and trigger conditions 310 to detect 806 anomaly, i.e., to detect that a trigger condition is met 1018 import a database replica accomplished by computation and data transfer, e.g., network packet transmissions 1020 download multiple replicas in parallel; this is an example of downloading 914

Conclusion

In short, the teachings herein provide a variety of adaptive database compaction functionalities 204 which operate in enhanced systems 202. Database 210 storage and retrieval efficiencies are enhanced 916, without 902 loss of database availability, and with particular attention to large databases 210 stored in a cloud 216. Adaptive database compaction technology 204, 900, 1000 automatically identifies 806 cost-effective opportunities for database compaction 214. The adaptive compaction technology 204, 900, 1000 may maintain 802 a baseline sleeve 308 representing a performance indicator's 306 normal range 504, track 804 the current performance indicator 306, and initiate 808 compaction 214 of a database 210 when a compaction trigger 310 based on at least the performance indicator 306 occurs. The performance indicator 306 may be based 508 a ratio 524 of logical size 520 to physical size 522, for example. The performance indicator 306 may be based 508 on samples 1006 from a proper subset 314 of the database 210. Kernel 120 overhead 530 may be recognized 508. A low-fragmentation secondary replica 320, 212 may be selected 814, compacted 214, and promoted 810 to replace 914 the prior primary replica 324, 212, which is demoted 812 to secondary status 320, 212. Secure cloud 216 blob 218 storage 220 may be used 914, 1004, 1018, 1020. A compaction decision 540 may be implemented 922 by allowing 932, delaying 928, or even preventing 930 compaction after the trigger 310 is met. An automatic balance between computational costs of compaction 214 and costs of continued database 210 use without compaction is kept 904, and may be tunable 908 by an administrator via tuning parameters 312.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8-10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds or ranges, specific architectures, specific attributes, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A database system for a high-availability database, the system comprising:

a digital memory having at least a nonvolatile database record storage portion (NDRS) and a processor working memory portion (PWM), the NDRS holding a primary replica of the database and at least one secondary replica of the database, each replica holding database records; and a processor in operable communication with the PWM, the processor configured to perform adaptive database compaction steps, the steps including (a) maintaining over a sleeve time period a baseline sleeve which represents a normal range of a performance indicator, the performance indicator based on at least the following with regard to a proper subset of the database: a number of database records, a database record size, and a size of the primary replica in the NDRS, (b) tracking values of the performance indicator, (c) initiating compaction of the secondary replica when a compaction trigger occurs, the compaction trigger based on the performance indicator, and (d) after the secondary replica is compacted, demoting the primary replica and promoting the compacted secondary replica;

whereby the database system maintains database availability during compaction and automatically adaptively balances compaction computational cost against a storage cost imposed by database fragmentation.

2. The system of claim 1, wherein the compaction trigger occurs in response to at least one of the following conditions:

one or more values of the performance indicator lie outside the baseline sleeve at least a predefined number of times within a predefined trigger time period;

multiple values of the performance indicator have a negative trend at or past a predefined trigger trend threshold; or at least one value of the performance indicator at or past a predefined trigger magnitude threshold.

3. The system of claim 1, wherein the NDRS comprises cloud blob storage.

4. The system of claim 1, wherein the proper subset of the database consists of the N largest tables in the database, and N is in the range of 1 to 10.

5. The system of claim 1, further comprising a database management system (DBMS) and a kernel, the DBMS configured to execute using the kernel, and wherein the performance indicator is also based on a kernel overhead which is dependent on the kernel.

6. The system of claim 1, wherein the system is configured with at least three of the following user-defined items, each user-defined item present in the system being definable by a user of the system through a file or command line or application program interface or graphical user interface:
- a performance indicator calculation interval which specifies how frequently the performance indicator is calculated while tracking the performance indicator;
- the sleeve time period which specifies how much performance indicator historic data is used in calculating the baseline sleeve;
- a sleeve calculation interval which specifies how frequently the baseline sleeve is calculated;
- a sleeve width which specifies an extent of values that lie within the sleeve at a given point in time;
- a sleeve exit count trigger which operates as a compaction trigger when one or more values of the performance indicator lie outside the baseline sleeve at least the sleeve exit count trigger number of times within a predefined trigger time period;
- a sleeve exit count time period which supports a compaction trigger when one or more values of the performance indicator lie outside the baseline sleeve at least the sleeve exit count trigger number of times within the sleeve exit count time period;
- a trend threshold trigger which operates as a compaction trigger when multiple values of the performance indicator have a negative trend at or past the trend threshold trigger;
- a magnitude threshold trigger which operates as a compaction trigger when at least one value of the performance indicator has a value at or past the magnitude threshold trigger;
- a table count which specifies how many database tables are in the proper subset of the database upon which the performance indicator is based; or
- a replica count which specifies how many replicas of the database are created.

7. A method for adaptive database compaction, comprising:
- maintaining over a sleeve time period a baseline sleeve which represents a normal range of a performance indicator, the performance indicator based on at least the following with regard to a proper subset of a database: a number of database records, a database record size, and a size of a primary replica of the database in a nonvolatile database record storage portion of digital data storage hardware;
- tracking values of the performance indicator;
- detecting a compaction trigger which is based at least partially based on the performance indicator;
- initiating compaction of a secondary replica of the database in response to detecting the compaction trigger;
- after the secondary replica is compacted, promoting the compacted secondary replica and demoting the primary replica;
- whereby the method automatically adaptively balances compaction computational cost against a storage cost imposed by database fragmentation.

8. The method of claim 7, wherein the performance indicator is also based on at least one of the following:
- a kernel overhead value which is fixed for a given kernel;
- a kernel overhead value which depends on a count of files used; or
- a ratio whose numerator depends on a database record size and a database record count and whose denominator depends on a number of allocated units in the nonvolatile database record storage portion.

9. The method of claim 7, wherein the method is further characterized in at least one of the following ways:
- a lowest-fragmented replica is selected for compaction;
- a performance indicator calculation interval specifies how frequently the performance indicator is calculated while tracking the performance indicator, and the performance indicator calculation interval is in a range from one minute to one hundred twenty minutes;
- the sleeve time period is in a range from one week to six months;
- a sleeve calculation interval specifies how frequently the baseline sleeve is calculated, and the sleeve calculation interval is in a range from twelve hours to one week; or
- a sleeve width specifies an extent of values that lie within the sleeve at a given point in time, and the sleeve width is in a range from one-half standard deviation to three standard deviations from the values of the performance indicator.

10. The method of claim 7, wherein the method is performed without usage of a secure shell public key.

11. The method of claim 7, further comprising:
- uploading the compacted secondary replica to a blob storage; and
- downloading copies of the compacted secondary replica to replace less-compact replicas of the database, thereby reducing the number of allocated units in the nonvolatile database record storage portion which hold the database.

12. The method of claim 7, wherein a value of the performance indicator which is based only on the compacted secondary replica is in the range from 0.9 to 1.1.

13. The method of claim 7, comprising obtaining at least one of the following from an interface to a database management system: the number of database records, or an average database record size.

14. The method of claim 7, further comprising raising a compaction alert in response to detecting the compaction trigger.

15. The method of claim 7, wherein the database resides at least partially in cloud storage.

16. A computer-readable storage medium configured with data and instructions which upon execution by a processor cause a computing system to perform a method for adaptive database compaction, the method comprising:
- maintaining over a sleeve time period a baseline sleeve which represents a normal range of a performance indicator, the performance indicator based on at least the following with regard to a proper subset of a database: a number of database records, a database record size, and a size of a primary replica of the database in a nonvolatile database record storage portion of digital data storage hardware;
- tracking values of the performance indicator;
- detecting a compaction trigger which is based at least partially based on the performance indicator;
- raising a compaction alert in response to detecting the compaction trigger;

receiving a compaction decision in response to raising the compaction alert; and implementing the compaction decision as follows:
- when the compaction decision calls for an immediate compaction, then initiating compaction of a secondary replica of the database;
- when the compaction decision calls for a delayed compaction, then initiating compaction of a secondary replica of the database after a delay condition that is specified by the compaction decision has been satisfied; and
- when the compaction decision calls for no immediate compaction, then avoiding initiating compaction of the database in response to the compaction alert.

17. The storage medium of claim 16, wherein the method further comprises operating the computing system according to at least two of the following user-defined items:
- a performance indicator calculation interval which specifies how frequently the performance indicator is calculated while tracking the performance indicator;
- the sleeve time period which specifies how much performance indicator historic data is used in calculating the baseline sleeve;
- a sleeve calculation interval which specifies how frequently the baseline sleeve is calculated;
- a sleeve width which specifies an extent of values that lie within the sleeve at a given point in time;
- a sleeve exit count trigger which operates as a compaction trigger when one or more values of the performance indicator lie outside the baseline sleeve at least the sleeve exit count trigger number of times within a predefined trigger time period;
- a sleeve exit count time period which supports a compaction trigger when one or more values of the performance indicator lie outside the baseline sleeve at least the sleeve exit count trigger number of times within the sleeve exit count time period;
- a trend threshold trigger which operates as a compaction trigger when multiple values of the performance indicator have a negative trend at or past the trend threshold trigger;
- a magnitude threshold trigger which operates as a compaction trigger when at least one value of the performance indicator has a value at or past the magnitude threshold trigger;
- a table count which specifies how many database tables are in the proper subset of the database upon which the performance indicator is based; or
- a replica count which specifies how many replicas of the database are created.

18. The storage medium of claim 17, wherein the method comprises operating the computing system according to at least four of the user-defined items.

19. The storage medium of claim 17, wherein the method comprises operating the computing system according to at least six of the user-defined items.

20. The storage medium of claim 17, wherein the method comprises operating the computing system according to at least eight of the user-defined items.

* * * * *